United States Patent [19]
Matsui

[11] Patent Number: 5,559,767
[45] Date of Patent: Sep. 24, 1996

[54] APPARATUS FOR DETECTING A FOCUS ERROR AND A TRACKING ERROR OF AN OPTICAL HEAD

[75] Inventor: Tsutomu Matsui, Tokyo, Japan

[73] Assignee: NEC Corporation, Japan

[21] Appl. No.: 364,761

[22] Filed: Dec. 27, 1994

[30] Foreign Application Priority Data

Dec. 27, 1993 [JP] Japan .................................. 5-333639

[51] Int. Cl.⁶ ...................................................... G11B 7/12
[52] U.S. Cl. ...................... 369/44.23; 369/112
[58] Field of Search .................. 369/44.23, 112, 369/44.24, 44.37, 44.41, 44.42, 44.14; 250/201.5

[56] References Cited

U.S. PATENT DOCUMENTS

| | | | |
|---|---|---|---|
| 4,079,247 | 3/1978 | Bricot et al. | 250/204 |
| 4,079,248 | 3/1978 | Lehureau et al. | 250/204 |
| 4,273,998 | 6/1981 | Kanamaru | 369/44.23 |
| 4,293,944 | 10/1981 | Izumita et al. | 369/44.23 X |
| 4,841,507 | 6/1989 | Imai et al. | 369/112 X |
| 4,856,108 | 8/1989 | Tinet | 369/109 |
| 5,105,411 | 4/1992 | Ishika | 369/44.23 X |
| 5,231,621 | 7/1993 | Matsui et al. | 250/201.5 X |

FOREIGN PATENT DOCUMENTS

| | | |
|---|---|---|
| 60-246025 | 5/1985 | Japan . |
| 60-113333 | 6/1985 | Japan . |
| 60-129943 | 7/1985 | Japan . |
| 62-88145 | 4/1987 | Japan . |
| 62-1973 | 4/1987 | Japan . |
| 1-144233 | 6/1989 | Japan . |
| 1-184644 | 7/1989 | Japan . |
| 0073425 | 3/1991 | Japan ........................ 369/44.23 |

*Primary Examiner*—Aristotelis Psitos
*Assistant Examiner*—Duncan Wilkinson
*Attorney, Agent, or Firm*—Ostrolenk, Faber, Gerb & Soffen, LLP

[57] ABSTRACT

An optical composite unit is provided to receive a light focused by a focusing lens for receiving a light reflected from an optical disc. The optical composite unit comprises a cylindrical lens and side-wedge prisms or side-cylindrical lenses which are provided on both sides of the cylindrical lens. The cylindrical lens has a height including a diameter of the focused light and a width narrower than the diameter, and an axis which is rotated by 45° relative to a long axis of a cylindrical beam formed by the cylindrical lens. The side-wedge prisms or side-cylindrical lenses form side beams separated from the cylindrical beam. The cylindrical beam is for detecting a focus error, and the side beams are for detecting a tracking error.

5 Claims, 10 Drawing Sheets

DEFOCUSED (FAR)

FOCUSED

DEFOCUSED (NEAR)

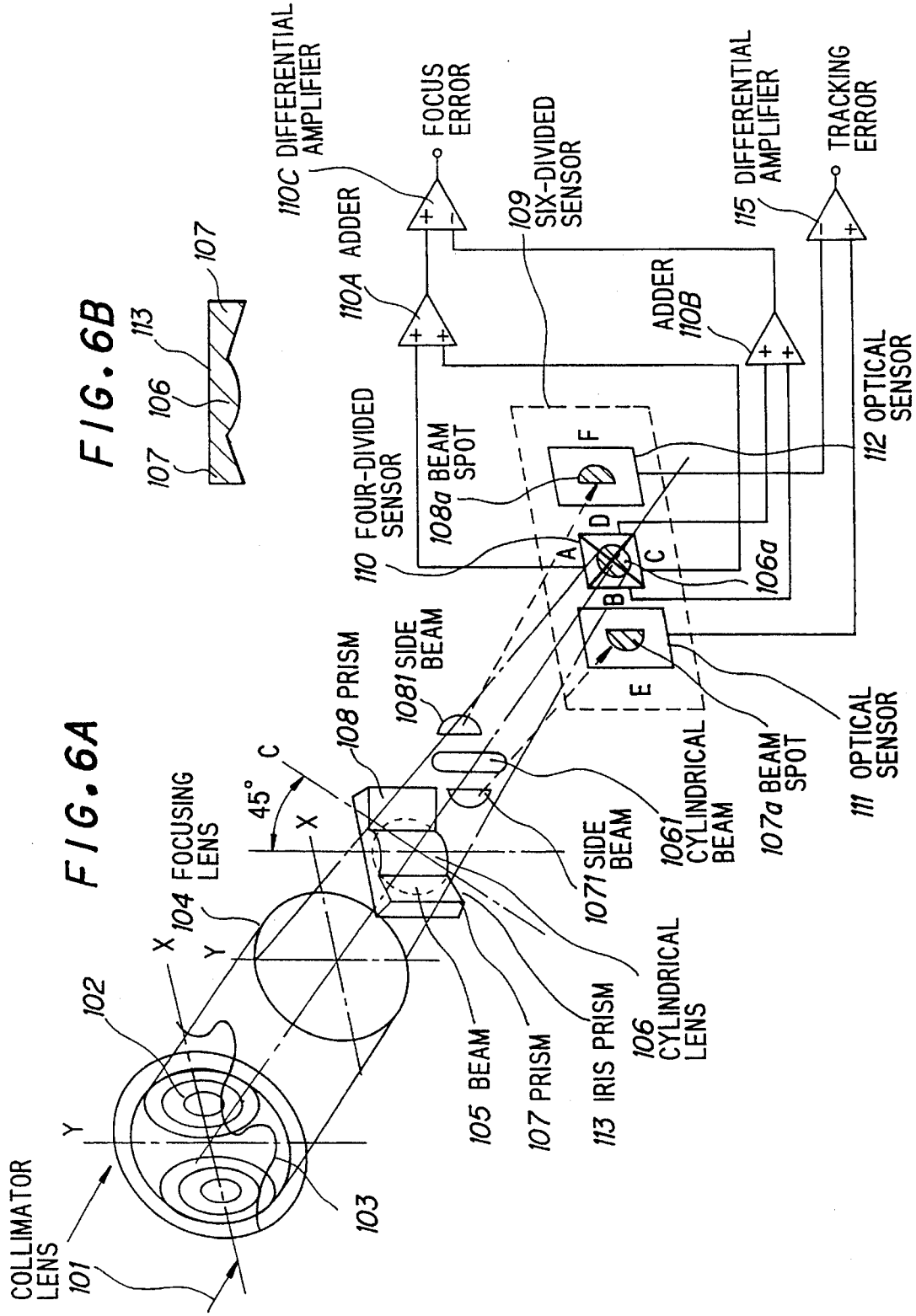

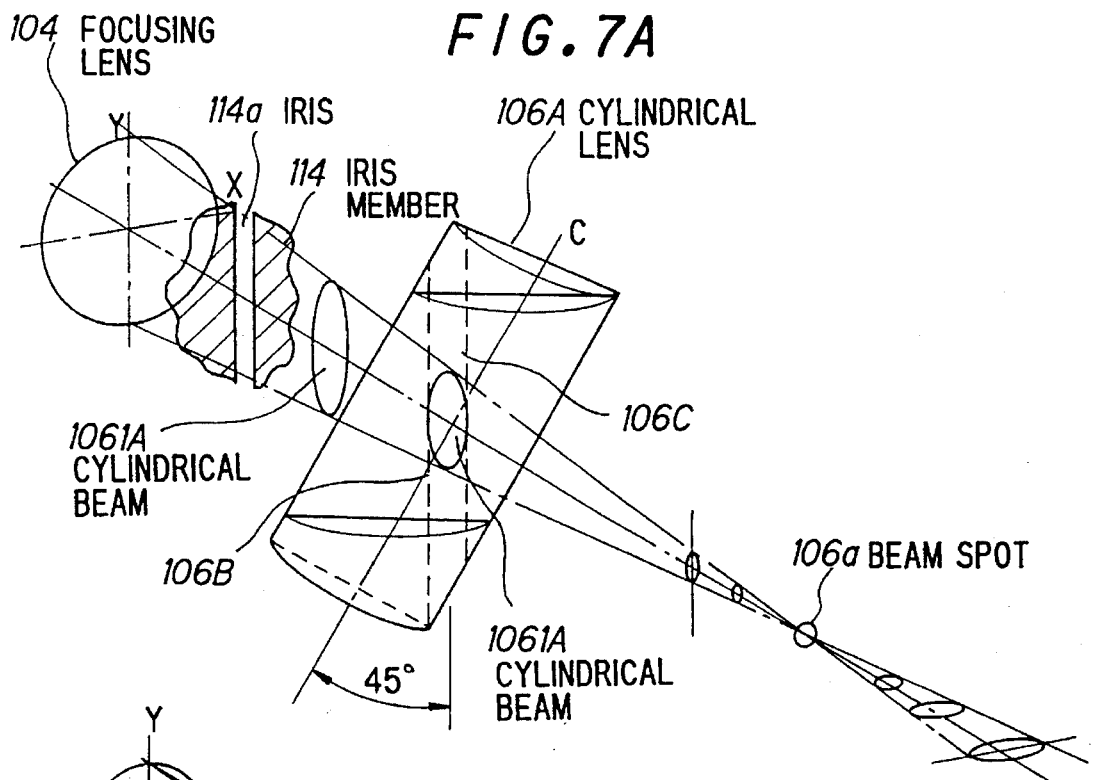
FIG. 7A
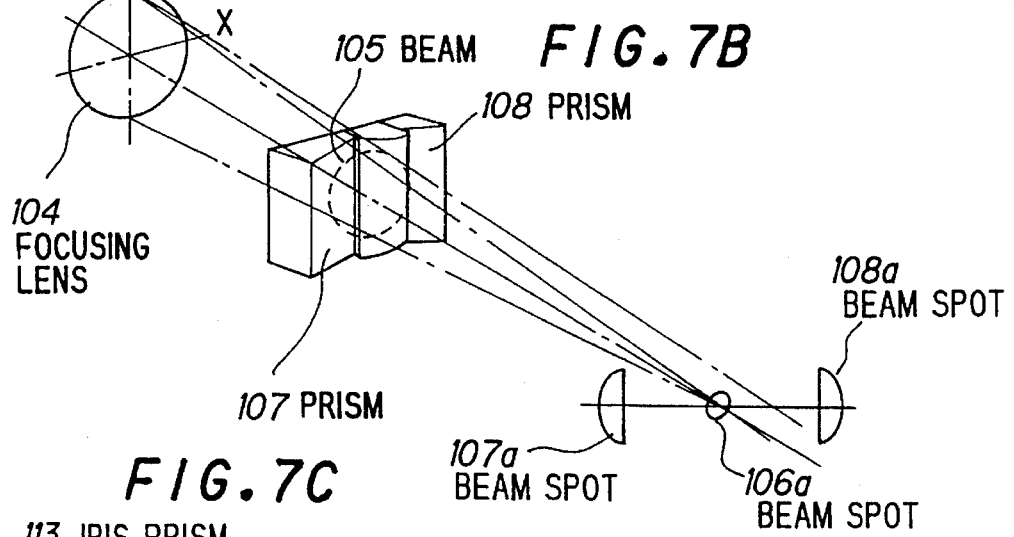
FIG. 7B
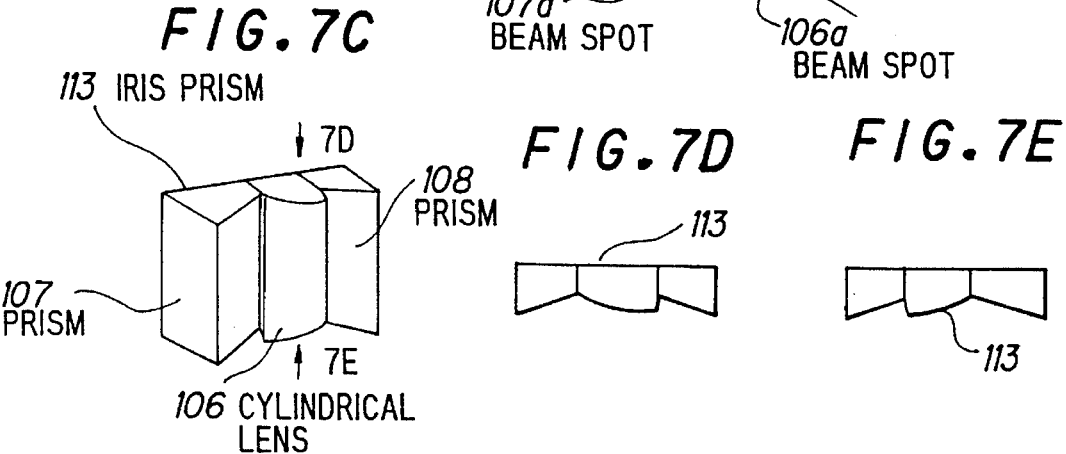
FIG. 7C
FIG. 7D
FIG. 7E

APPARATUS FOR DETECTING A FOCUS ERROR AND A TRACKING ERROR OF AN OPTICAL HEAD

FIELD OF THE INVENTION

The invention relates to an apparatus for detecting a servo signal of an optical head, and more particularly to, an apparatus for detecting focus and tracking errors in accordance with one beam reflected from an optical disc.

BACKGROUND OF THE INVENTION

An optical disc apparatus has been developed to provide high density storage of information and high speed transfer rate of information. For instance, an optical disc apparatus to be adapted to a Hi-vision television system having an information amount which is five times greater than that of a conventional NTSC television system, and an external storage apparatus for computer peripheral having high speed and access properties of a magnetic disc used for a computer and a large capacity memory property of an optical disc have been intensively researched and developed. Disc apparatus for the next generation is expected for an optical disc apparatus in consideration of the necessity of high speed transfer rate and large capacity memory. Especially, it is required that the weight of an optical head itself is reduced to provide high speed access.

The basic structure of an optical head is mainly contructed in one-beam system or three-beam system. It is said that each of them is advantageous in one aspect, and disadvantageous in the aspect. However, the one-beam system is considered to be advantageous in that no dispersion light is observed in recording information, although it depends on a sensitivity of a recording medium. In a recording and reproducing type of an optical head, the maximum output power of a laser which is available at the present time is approximately 35 mW.

Conventional optical heads using one-beam system is described in the Japanese Patent Kokai Nos. 60-129943 and 62-88145.

In the conventional optical heads, a first conventional apparatus for detecting a servo signal of an optical head comprises first and second four-divided optical sensors for focus and tracking error detections, and a second conventional apparatus for detecting a servo signal of an optical head comprises a six-divided optical sensor of focus and tracking error detections. The detail of the first and second conventional apparatus will be explained later.

In the first and second conventional apparatus for detecting a servo signal of an optical head, however, there are disadvantages in that a focus error signal of high precision is difficult to be obtained, because a tracking error signal is leaked into the focus error signal, and stability and reliability of providing a six-divided optical sensor are low, because the divided photodetector regions are required to be adjusted by the order of μm.

SUMMARY OF THE INVENTION

Accordingly, it is an object of the invention to provide an apparatus for detecting a servo signal of an optical head in which a focus error signal of high precision is obtained without influence of a tracking error signal.

It is a further object of the invention to provide an apparatus for detecting a servo signal of an optical head in which a six-divided optical sensor having high stability and reliability is obtained with easy adjustment and small size.

According to the invention, an apparatus for detecting a servo signal of an optical head, comprises:

a focusing lens for focusing a light reflected from an optical disc storing information to provide a focused light;

an optical composite unit for providing a cylindrical beam and side beams by receiving the focused light, the cylindrical beam having a long axis including a diameter of the focused light thus received and a short axis being narrower than the diameter, and the side beams being separated from the cylindrical beam; and an optical sensor for detecting focus and tracking error by separately receiving light beams based on the cylindrical beam and the side beams.

BRIEF DESCRIPTION OF THE DRAWINGS

The invention will be explained in more detail in conjunction with appended drawings, wherein:

FIG. 6A and 6B are explanatory diagrams showing an apparatus for detecting a :servo signal of an optical head in a first preferred embodiment according to the invention;

FIGS. 7A to 7E are explanatory diagrams explaining operation and principle in the first preferred embodiment;

DESCRIPTION OF THE PREFERRED EMBODIMENTS

Before explaining a method and an apparatus for detecting a servo signal of an optical head in the preferred embodiments according to the invention, the aforementioned conventional apparatus fore detecting a servo signal of an optical head will be explained.

Figure 1:
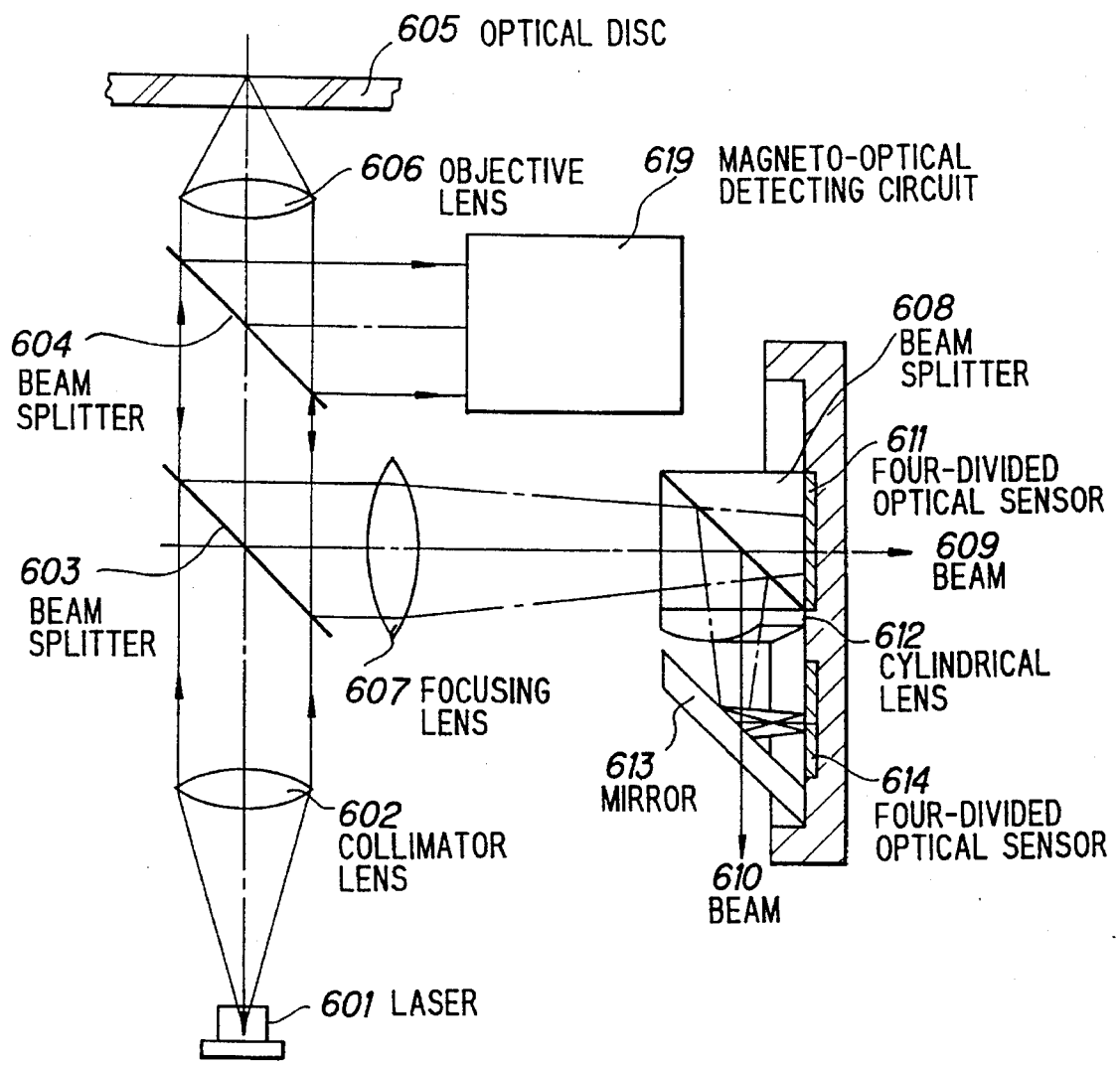
FIG. 1 is an explanatory diagram showing a first conventional apparatus for detecting a servo signal of an optical head.

In FIG. 1, the first conventional apparatus for detecting a servo signal of an optical head comprises a laser 601, a collimator lens 602, beam splitters 603 and 604, an optical disc 605, an objective lens 606, a focusing lens 607, a beam splitter 608, a four-divided optical sensor 611, a cylindrical lens 612, a reflecting mirror 613, a four-divided optical sensor 614, and a magneto-optical detecting unit 615.

In operation, a light emitted from the laser 601 is collimated by the collimator lens 602, and a P-polarization of the collimated light is transmitted through the beam splitters 603 and 604, and is focused on the optical disc 605 by the objective lens 606. A light reflected from the optical disc 605 is deflected to be supplied to the magneto-optical detecting unit 615 by the beam splitter 604 having a reflection efficiency of 100% for a S-polarization of the reflected light. The P-polarization of the reflected light is transmitted through the beam splitter 604 and is deflected to be supplied to the focusing lens 607 by the beam splitter 603. The deflected light is focused by the focusing lens 607, and the focused light is divided to be supplied to the four-divided optical sensor 611 as a beam 609 and to be deflected in the direction of the reflecting mirror 613 as a beam 610. The beam 609 is received by the four-divided optical sensor 611, and the beam 610 is transmitted through the cylindrical lens 621 and is reflected to be received in the four-divided optical sensor 614 by the reflecting mirror 613.

Figure 2:
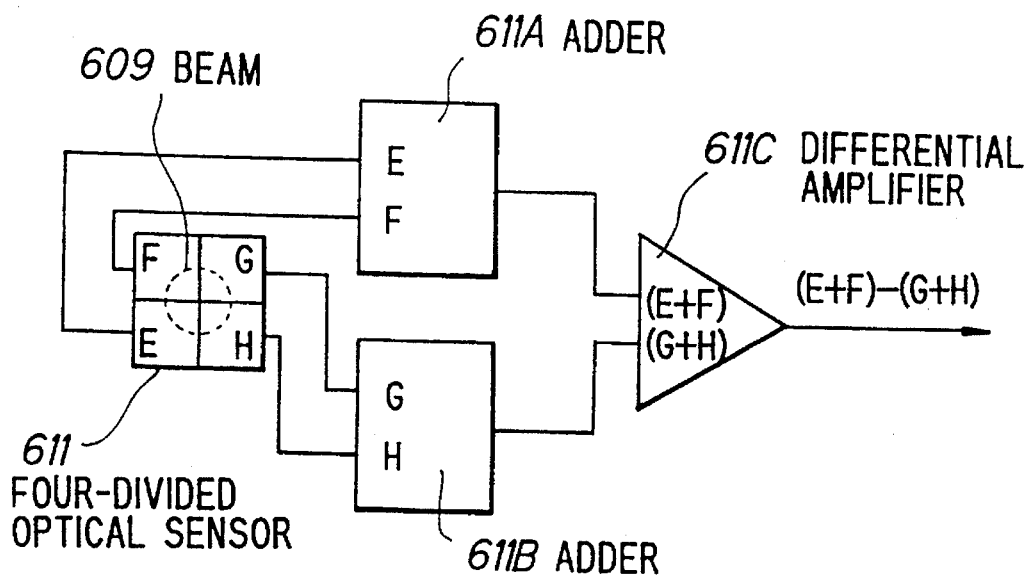
FIGS. 2 and 3 are block diagrams showing circuits for detecting focus and tracking error signals in the first conventional apparatus in FIG. 1.

FIG. 2 shows the four-divided optical sensor 611 having regions E and F connected to an adder 611A and regions G and H connected to an adder 611B, whose summation outputs of (E+F) and (G+H) are supplied to a differential amplifier 611C.

In the differential amplifier 611C, a calculation of (E+F)−(G+H) is carried out to provide na output signal which is a tracking error signal.

Figure 3:
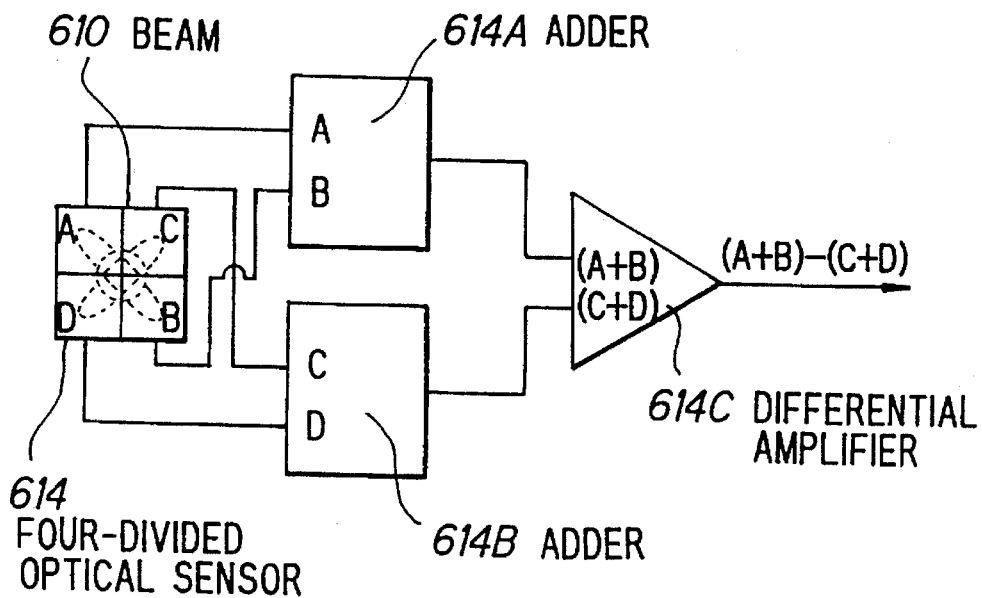

FIG. 3 shows the four-divided optical sensor 614 having regions A and B connected to an adder 614A and regions C and D connected to an adder 614B, whose summation outputs of (A+B) and (C+D) are supplied to a differential amplifier 614C.

In the differential amplifier 614C, a calculation of (A+B)−(C+D) is carried out to provide an output signal which is a focus error signal.

Figure 4:
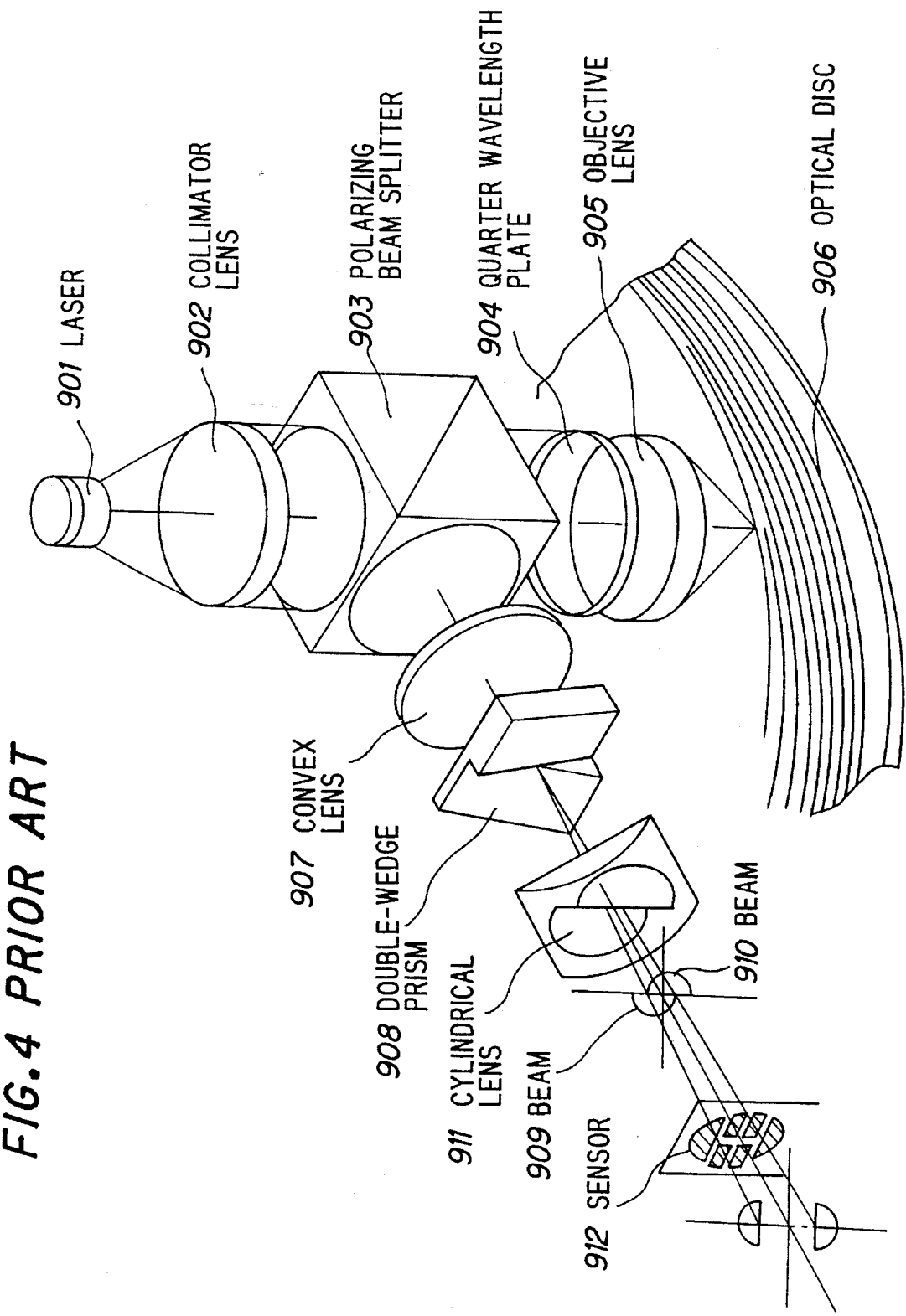
FIG. 4 is an explanatory diagram showing a second conventional apparatus for detecting a servo signal of an optical head.

FIG. 4 shows the second conventional apparatus for detecting a servo signal of an optical head which comprises a laser 901, a collimator lens 902, a polarizing beam splitter 903, a quarter-wavelength plate 904, an objective lens 905, an optical lens 906, a convex lens 907, a double-wedge prism 908, a cylindrical lens 911, and a six-divided optical sensor 912.

In operation, a light emitted from the laser 901 is collimated by the collimator lens 902, and the collimated light is transmitted through the polarizing beam splitter 903 to be supplied to the quarter-wavelength plate 904, in which an input polarization is converted to an output circular polarization. The polarization-converted light is focused on the optical disc 906 by the objective lens 905. A light reflected from the optical disc 906 is deflected by the polarizing beam splitter 903, and the deflected light is focused by the convex lens 907. The focused light is divided into two beams 909 and 910 in the left and right directions by the double-wedge prism 908, and the divided beams 909 and 910 are diffused in an angle i the upper and lower directions by the cylindrical lens 911. Then, the two beams 909 and 910 are received in the six-divided optical sensor 912.

Figure 5C:
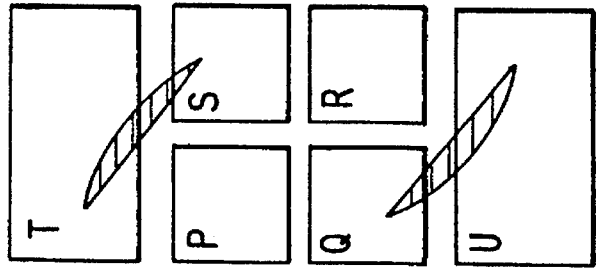
FIGS. 5A to 5C are explanatory diagrams explaining focused and defocused state in the second conventional apparatus in FIG. 4.
Figure 5B:
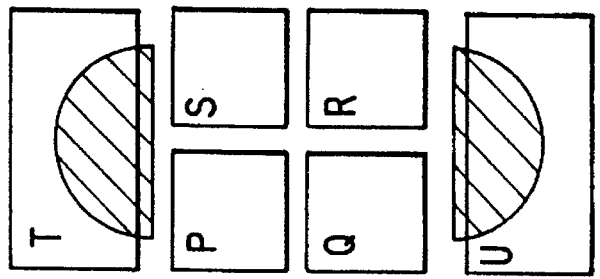
Figure 5A:
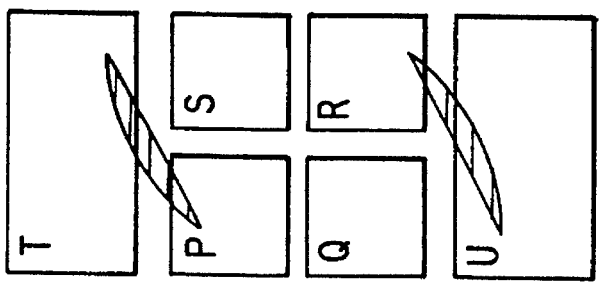

As shown in FIGS. 5A to 5C, the six-divided optical sensor 912 comprises six regions P, Q, R, S, T and U, wherein the four regions P, Q, R and S are for a focus error, and the two regions T and U are for a tracking error. FIG. 5B shows the state in which the optical disc 906 is precisely focused by the objective lens 905, while FIG. 5A shows the state in which a distance between the objective lens 905 and the optical disc 906 is shorter than a precisely focused distance, and FIG. 5C shows the state in which a distance therebetween is longer tan the focused distance.

In the error detection, a focus error signal FE is obtained as a result of calculating an equation (1) of output signals from the regions P, Q, R and S, and a tracking error signal TE is obtained as a result of calculating an equation (2) of output signals from the regions T and U, as set out below.

$$FE=(P+R)-(Q+S) \quad (1)$$

$$TE=T-U \quad (2)$$

Next, an apparatus for detecting a servo signal of an optical head in the first preferred embodiment will be explained in FIGS. 6A and 6B.

FIG. 6A shows the apparatus for detecting a servo signal of an optical head which comprises a focusing lens 104 for focusing a collimated beam 101 which is a light reflected from an optical disc (not shown) storing information, a cylindrical lens 106 having an axis C which is rotated by 45° relative to a long axis of an elliptical beam 1061 including a diameter of a circular beam 105 formed by the focusing lens 104 (a cross section of the cylindrical lens 106 being shown in FIG. 6B), symmetrically arranged prisms 107 and 108 which are fixed on both sides of the cylindrical lens 106 in parallel to the long axis of the elliptical beam 1061, a six-divided optical sensor 109 comprising a four-divided sensor 110 having regions A, B, C and D for detecting a focus error, and two sensors 111 and 112 having regions E and F for detecting a tracking error signal. In this apparatus, the cylindrical lens 106 and the prisms 107 and 108 constitute a composite optical member defined hereinafter "an iris prism 113" for providing the cylindrical beam 1061 for a focus error, and beams 1071 and 1081 for a tracking error.

In the apparatus as described above, the collimated light 101 reflected from the optical disc (not shown) is represented by a light amount contour-line-pattern 102 and a light intensity indicating line 103 having two peaks which are generated by diffraction on the track groove of the optical disc. The diffracted light caused by the track groove will intermodulate into a focus error signal when the focus servo control is carried out. Therefore, this will cause a disturbance for the focus servo control, and it is desired that a light beam which is not affected by a track groove of the optical disc is obtained to overcome the disturbance. For this purpose the iris prism 113 is provided with the cylindrical lens 106 which does not cover the side regions of the beam 105, and the prisms 107 and 108 covering the side regions of the beam 105 which are not covered by the cylindrical lens 106, so that the cylindrical beam 1061 for a focus error signal which is not affected by a tracking error signal is obtained to be separated from the beams 1071 and 1081 for the tracking error signal.

In operation, the elliptical beam 1061 is positioned in the vicinity of a focal point of the focusing lens 104 to be rotated by 90°, when it is in the vicinity of the photodetector 109, and it will be an approximately circular beam on the four-divided sensor 110 in accordance with astigmatism of the cylindrical lens 106, because the cylindrical lens 106 has different focal lengths for x- and y-cordinate-axes. The regions A and B of the four-divided sensor are connected to the adders 110A, and C and D of the four-divided sensor 110 are connected to the adders 110B, and, outputs of the adders 110A and 110B are connected to a differential amplifier 110C, so that a focus error signal of (A+C)−(B+D) is obtained at an output of the differential amplifier 110C.

The regions E and F of the optical sensors 111 and 112 are connected to a differential amplifier 115, so that a tracking error signal of (E−F) is obtained at an output of the differential amplifier 115.

In FIG. 7C, the iris effect of the invention will be explained, wherein it is assumed that an iris member 114 having an iris 114a is provide between the focusing lens 104 and a cylindrical 106A is provided. Thus, a cylindrical beam 1061A is obtained in accordance with the provision of the iris 114a, and the cylindrical beam 1061A is supplied to the cylindrical lens 106A having an axis C which is rotated by 45° relative to the cylindrical beam 1061A. Then, the focused beam 106a is obtained at the position for the six-divided optical sensor 109.

This means that the side portions of the cylindrical lens 106A which are outside the dotted lines 106B and 106C are not necessary for the cylindrical beam 1061A, and, therefore, these side portions may be cut away.

In FIG. 7B and 7C, the iris prism 113 will be illustrated more clearly. As explained before, the wedge prisms 107 and 108 are fixed on the both sides of the cylindrical lens 106, that is, the cut-away portions in FIG. 7A, in parallel to the long axis of the cylindrical beam 1061A. FIGS. 7D and 7E shows a top and a bottom of the iris prism 113 thus fabricated as seen in the directions indicated in FIG. 7C by the arrows 7D and 7E.

In the first preferred embodiment, the wedge prisms 107 and 108 may be replaced by cylindrical lenses symmetrically divided on the left and right sides.

An apparatus for detecting a servo signal of an optical head in the second preferred embodiment will be explained in FIG. 8A, wherein the reference numeral 301 indicates a cylindrical lens, 302 and 303 prisms, 304 an iris prism, 305 a focusing lens, 306 and 307, and 306a and 307a beams, and 308 a six-divided optical sensor.

Figures 8A, 8B:
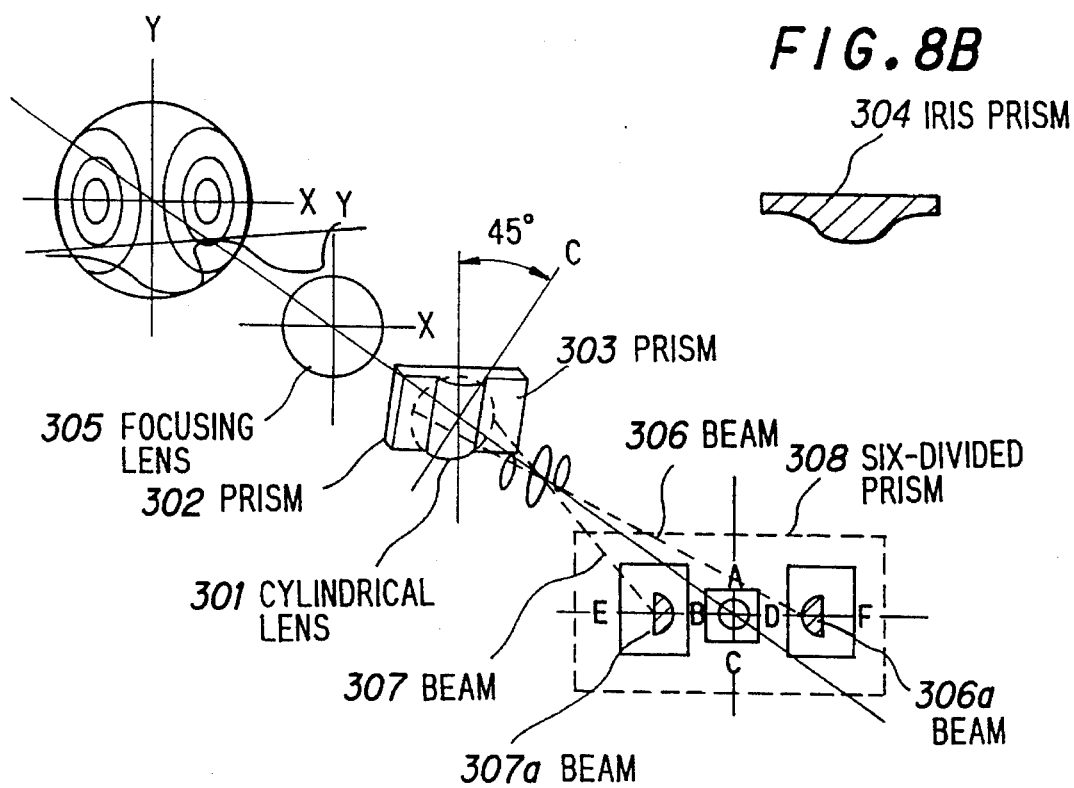
FIGS. 8 to 10 are explanatory diagrams showing apparatus for detecting a servo signal of an optical head in second to fourth preferred embodiments according to the invention.

In the second preferred embodiment, the iris prism 304 comprises the cylindrical lens 301 for detecting a focus error, and the wedge prisms 303 and 304 for detecting a tracking error, and a cross-section of the iris prism 304 is shown in FIG. 8B. The light beams 306 and 307 are crossed after being transmitted through the wedge prisms 302 and 303 to be supplied to the regions E and F of the six-divided sensor 308, so that a tracking error signal is obtained by the calculation of (E–F). A focus error signal is obtained by the calculation of (A+C)–(B+D) in the regions A, B, C and D of the six-divided sensor 308.

In the first and second preferred embodiments, the iris prisms 113 and 304 may be molded by, for instance, polyolefine resin, poly methyle meta acrylete (PMMA) resin, glass mold, etc.

Figure 9:
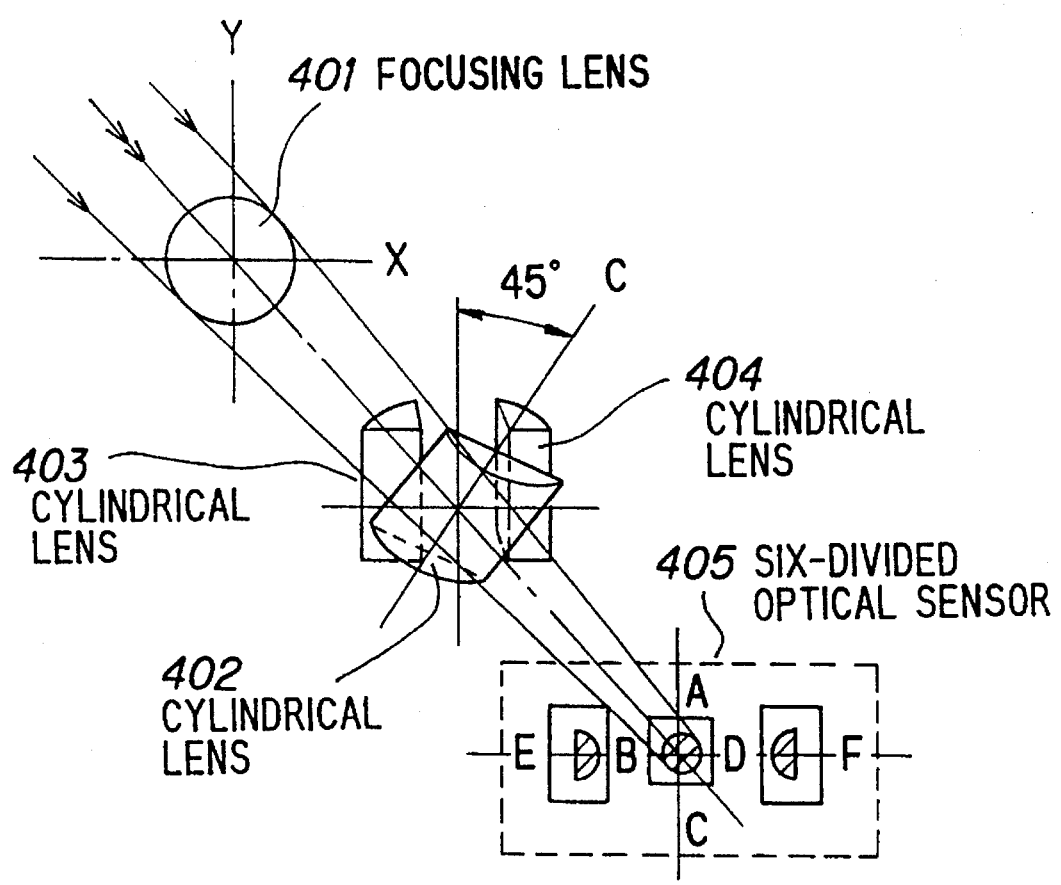

An apparatus for detecting a servo signal of an optical head in the third preferred embodiment will be explained in FIG. 9, wherein the reference numeral indicates a focusing lens, 402 a cylindrical lens, 403 and 404 cylindrical lenses or wedge prisms, and 405 a six-divided optical sensor.

In the third preferred embodiment, a cylindrical axis of the cylindrical lens 402 is slat to Y-axis by 45°, and the split-type cylindrical lenses having shorter focal lengths than that of the cylindrical lens 402 or wedge prisms 403 and 404 are provided on the both sides thereof. Focus and tracking error signals are obtained in the six-divided sensor 405 in the same manner as in the first and second preferred embodiments.

An apparatus for detecting a servo signal of an optical head in the fourth preferred embodiment will be explained in FIG. 10, wherein the reference numeral 501 indicates a focusing lens, 502 a cylindrical lens, 503 and 504 cylindrical lenses or wedge prisms, and 505 a lens, 506 to 509 beams, and 510 a six-divided optical sensor.

Figure 10:
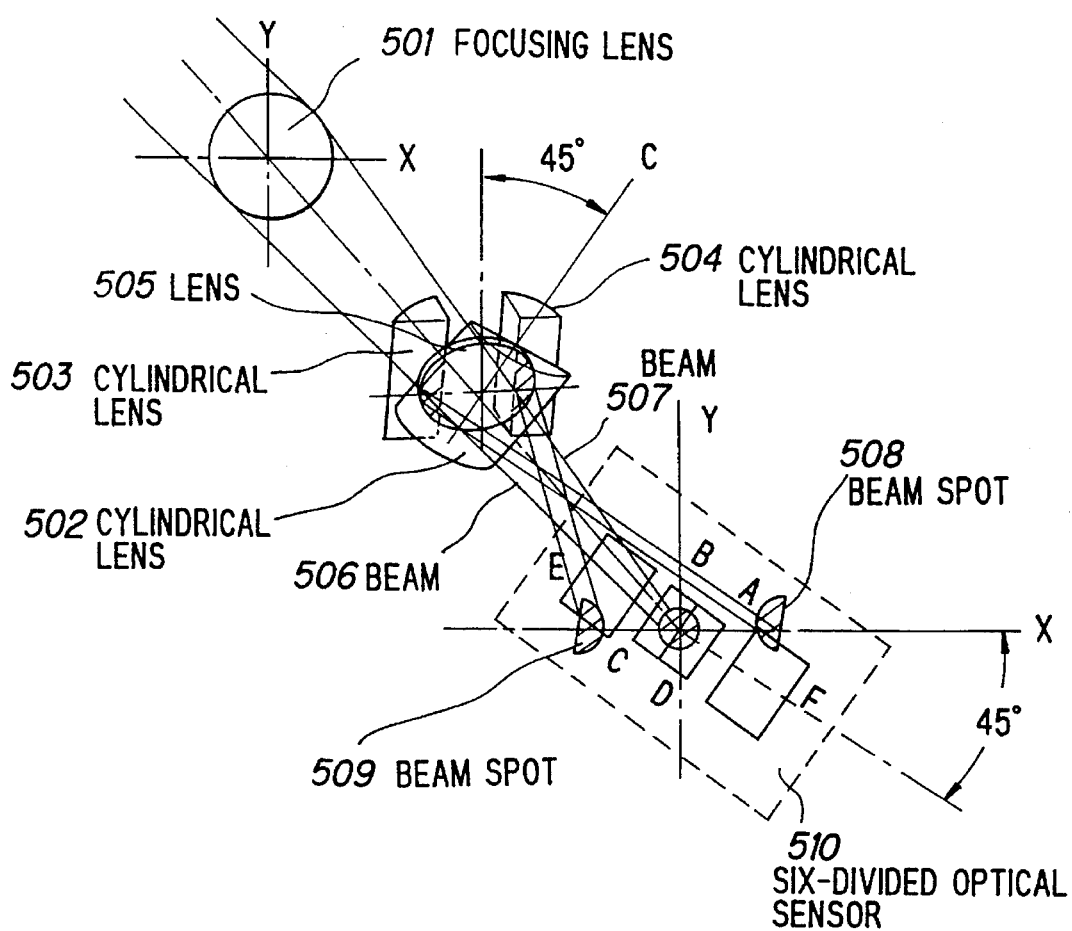

In the fourth preferred embodiment, the six-divided sensor 510 is arranged to be rotated to X-coordinate-axis by 45°, so that the beams 508 and 509 are partially received by the regions E and F of the optical sensor 510, respectively, as shown in FIG. 10.

Figure 11A:
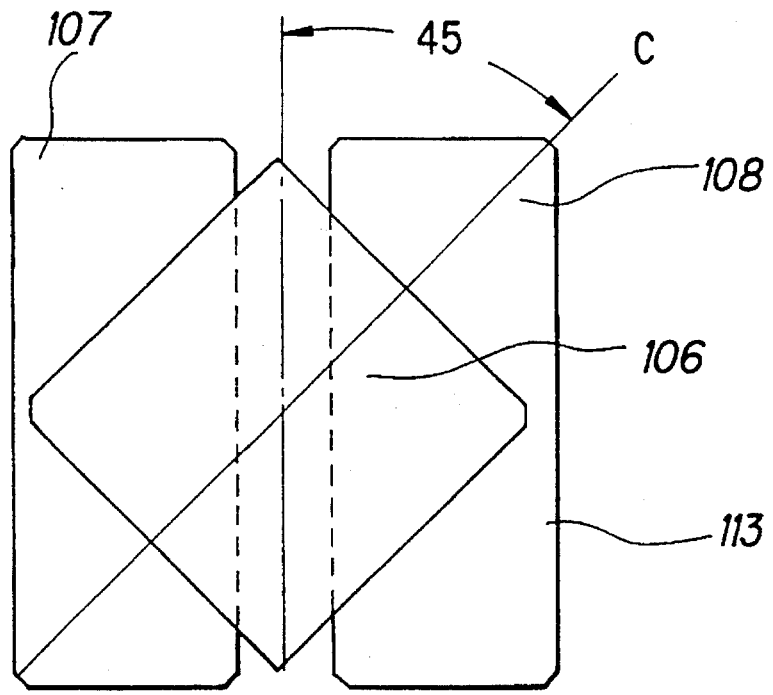
FIGS. 11A to 11B are front and top view of an iris prism to be use in the preferred embodiments according to the invention.
Figure 11B:
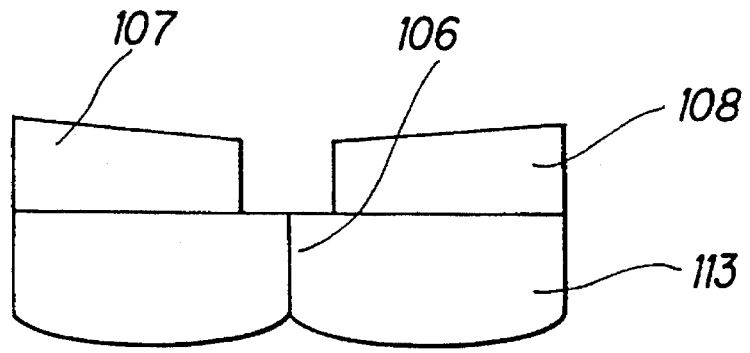

In the first to the fourth preferred embodiments, the cylindrical lens may be in the form of a square having the same dimension in height and width or a rectangle having a height larger in dimension than a width. One example of the square cylindrical lens is shown in FIGS. 11A and 11B, wherein like reference numerals indicate like parts as used in the first to fourth preferred embodiments.

Although the invention has been described with respect to specific embodiment for complete and clear disclosure, the appended claims are not to be thus limited but are to be constructed as embodying all modification and alternative constructions that may be occur to one skilled in the art which fairly fall within the basic teaching here is set forth.

What is claimed is:

1. An apparatus for detecting a servo signal of an optical head, comprising:

a focusing lens for focusing a light reflected from an optical disc storing information to provide a focused light;

an optical composite unit for providing a cylindrical beam and side beams by receiving said focused light, said cylindrical beam having a long axis including a diameter of said focused light thus received and a short axis being narrower than said diameter, and said side beams being separated from said cylindrical beam; and an optical sensor for detecting focus error and tracking error by separately receiving light beams based on said cylindrical beam and said side beams;

said optical composite unit, comprising:

a first cylindrical lens for forming said cylindrical beam, an axis of said first cylindrical lens being slant by 45° relative to said long axis of said cylindrical beam and having a height including said diameter of said focused light and a width being narrower than said diameter;

two second cylindrical lenses for forming said side beams, said two second cylindrical lenses being positioned on both sides of said first cylindrical lens in parallel to said long axis of said cylindrical beam.

2. An apparatus for detecting a servo signal of an optical head, comprising:

a focusing lens for focusing a light reflected from an optical disc storing information to provide a focused light;

an optical composite unit for providing a cylindrical beam and side beams by receiving said focused light, said cylindrical beam having a long axis including a diameter of said focused light thus received and a short axis being narrower than said diameter, and said side beams being separated from said cylindrical beam; and an optical sensor for detecting focus error and tracking error by separately receiving light beams based on said cylindrical beam and said side beams;

said optical composite unit, comprising:

a first cylindrical lens for forming said cylindrical beam, an axis of said first cylindrical lens being slant by 45° relative to said long axis of said cylindrical beam and having a height including said diameter of said focused light and a width being narrower than said diameter;

two second cylindrical lenses for forming said side beams, said two second cylindrical lenses being positioned on both sides of said first cylindrical lens in parallel to said long axis of said cylindrical beam;

said height of said first cylindrical lens is longer in dimension than said width thereof.

3. An apparatus for detecting a servo signal of an optical head, comprising:

a focusing lens for focusing a light reflected from an optical disc storing information to provide a focused light;

an optical composite unit for providing a cylindrical beam and side beams by receiving said focused light, said cylindrical beam having a long axis including a diameter of said focused light thus received and a short axis being narrower than said diameter, and said side beams being separated from said cylindrical beam; and an optical sensor for detecting focus error and tracking error by separately receiving light beams based on said cylindrical beam and said side beams;

said optical composite unit, comprising:
  a first cylindrical lens for forming said cylindrical beam, an axis of said first cylindrical lens being slant by 45° relative to said long axis of said cylindrical beam and having a height including said diameter of said focused light and a width being narrower than said diameter;
  two second cylindrical lenses for forming said side beams, said two second cylindrical lenses being positioned on both sides of said first cylindrical lens in parallel to said long axis of said cylindrical beam;

said height of said first cylindrical lens is equal in dimension to said width thereof.

4. An apparatus for detecting a servo signal of an optical head, comprising:

a focusing lens for focusing a light reflected from an optical disc storing information to provide a focused light;

an optical composite unit for providing a cylindrical beam and side beams by receiving said focused light, said cylindrical beam having a long axis including a diameter of said focused light thus received and a short axis being narrower than said diameter, and said side beams being separated from said cylindrical beam; and an optical sensor for detecting focus error and tracking error by separately receiving light beams based on said cylindrical beam and said side beams;

said optical composite unit, comprising:
  a first cylindrical lens for forming said cylindrical beam, an axis of said first cylindrical lens being slant by 45° relative to said long axis of said cylindrical beam and having a height including said diameter of said focused light and a width being narrower than said diameter;
  two second cylindrical lenses for forming said side beams, said two second cylindrical lenses being positioned on both sides of said first cylindrical lens in parallel to said long axis of said cylindrical beam;

said first cylindrical lens and said second cylindrical lenses are fixed to each other.

5. An apparatus for detecting a servo signal of an optical head, comprising:

a focusing lens for focusing a light reflected from an optical disc storing information to provide a focused light;

an optical composite unit for providing a cylindrical beam and side beams by receiving said focused light, said cylindrical beam having a long axis including a diameter of said focused light thus received and a short axis being narrower than said diameter, and said side beams being separated from said cylindrical beam; and an optical sensor for detecting focus error and tracking error by separately receiving light beams based on said cylindrical beam and said side beams;

said optical composite unit, comprising:
  a first cylindrical lens for forming said cylindrical beam, an axis of said first cylindrical lens being slant by 45° relative to said long axis of said cylindrical beam and having a height including said diameter of said focused light and a width being narrower than said diameter;
  two second cylindrical lenses for forming said side beams, said two second cylindrical lenses being positioned on both sides of said first cylindrical lens in parallel to said long axis of said cylindrical beam;

said first cylindrical lens and said second cylindrical lenses are molded to provide an integral form.

* * * * *